Patented Sept. 16, 1941

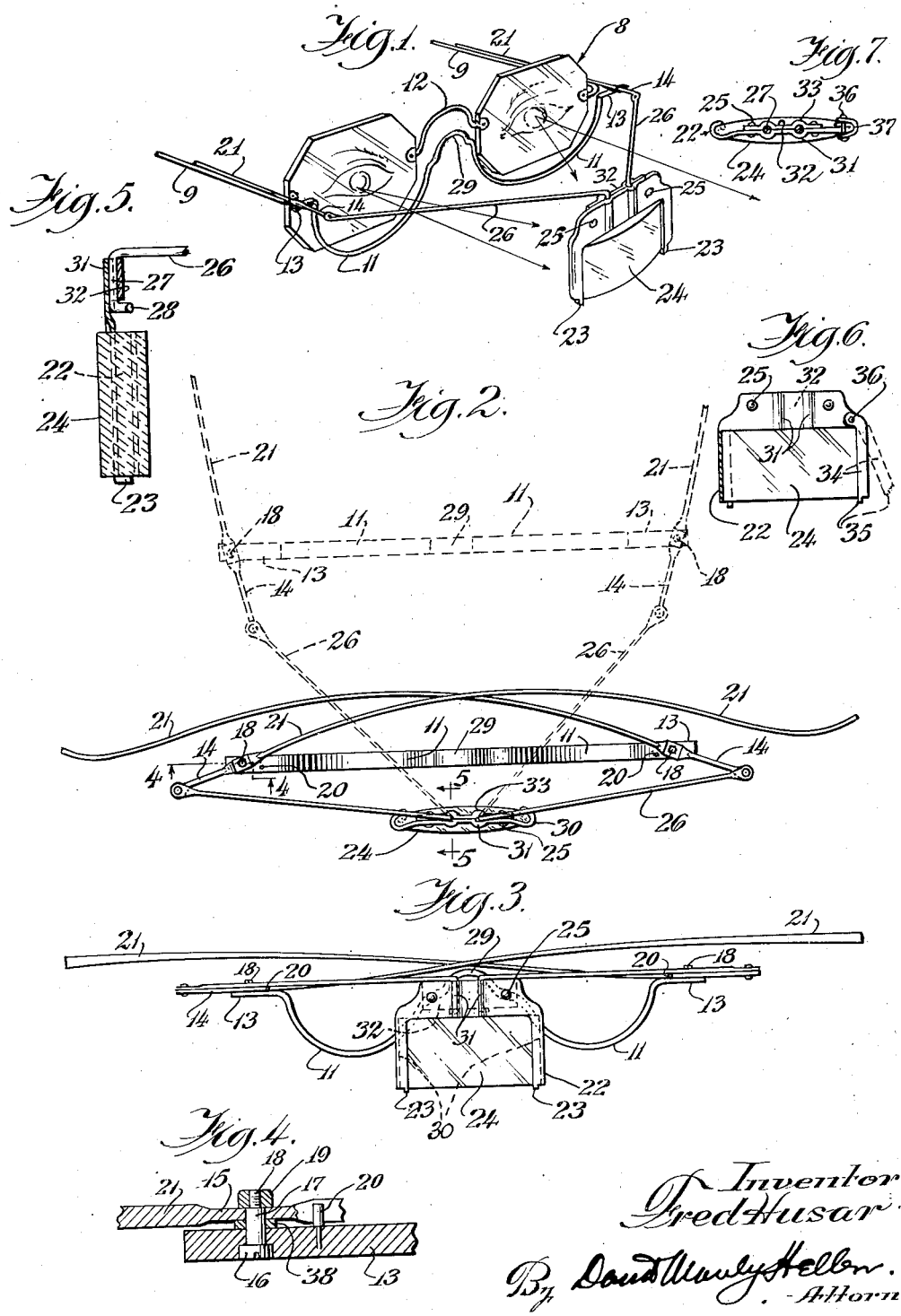

2,256,026

UNITED STATES PATENT OFFICE 2,256,026

BINOCULAR

Fred Husar, Chicago, Ill.

Application August 2, 1939, Serial No. 288,005

2 Claims. (Cl. 88—41)

This invention relates to binoculars and especially to a light weight type of construction, which may be worn conveniently with or without spectacles, and has for its main object the provision of improvements to my co-pending application Serial No. 274,204.

One object of the invention is the provision of a collapsible type of binocular structure which is provided with positive means for stopping and holding the lens in focal location simultaneously with the opening of the temple bar members when the same are set to fit the head of a person intending to use them.

Another object of the invention is to provide a single lens structure which will permit vision thru one common focal point or focal center of the said lens, and which will permit a user to look therethru with both eyes at the same time having no interfering structure in between such as is customarily used in binocular structures thus presenting a true and clear view.

Another object of the invention is the provision of a lens mounting member which permits of ready accessibility for replacement and interchangeability of lenses.

Other objects of the invention will become apparent when referring to the accompanying drawing, and the following description, wherein like symbols are used to designate like parts and in which;

Fig. 1 is an isometric view showing diagrammatically the eyes of a person wearing my device, who may also wear glasses at the time, showing also that the wearing of glasses, in no way interferes or impedes the wearing, operation, or use of my invention.

Fig. 2 is a top view looking at my invention when in collapsed form, and showing also in dotted arrangement the open position of the frame work comprising my invention.

Fig. 3 is a front view of the view shown in Figure 2.

Fig. 4 is a staggered cross-sectional view on the line 4—4 of Figure 2.

Fig. 5 is a cross-sectional view on the line 5—5 of Figure 2.

Fig. 6 is a slightly modified form of lens holders in front elevation.

Fig. 7 is a top view of the view shown in Figure 6.

Referring to the various views it will be noted in Figure 1 that a standard pair of spectacles is generally designated by the numeral 8, having a bridge member designated by the numeral 12, and temple bar members designated by the numeral 9.

My invention as described in my co-pending application is similarly constructed and has a bridge member designated by the numeral 11, having a section designated by the numeral 29 to fit the nose of a wearer conveniently, and is provided with temple bar members designated by the numeral 21. This view is schematic and the lens is shown in schematic relationship with the remainder of the structure; the main purpose of this view being to show that a wearer who must use spectacles for corrective vision, will find that the device will readily fit alongside of such spectacles and in no way interfere with or impede the efficient use of my invention.

Referring to Figure 2, and as described in my co-pending application, I provide a bridge member generally designated by the numeral 11, however in this case I provide two extensions designated by the numeral 13, and by referring to Figure 4, I show the means utilized for stopping the lens in focal position when the temple bars 21 are opened as indicated by the dotted lines ready to be placed on the head of a user, or a person desiring to inspect certain specimens with the binoculars comprising my invention.

The stopping means consists of a stopping pin member designated by the numeral 20 which may be driven into the portion 13 of the member 11, or the portion 13 being of sheet metal may have formed integrally therewith a lug portion for stopping the temple bar designated by the numeral 21.

The temple bar is provided with a flat swaged portion designated by the numeral 15 which is adapted to ride on the bearing washer designated by the numeral 38. The assembly is held in place by virtue of a fillister head screw designated by the numeral 16 the portion 13 being suitably counter-bored to receive the same, and having a body portion designated by the numeral 17, and a reduced threaded portion designated by the numeral 18 adapted to receive the nut designated by the numeral 19.

The length of the body portion designated 17 is approximately ten thousandths of an inch more than the combined dimensions of the depth of the bore in the portion 13, the thickness of the washer 38, and the thickness of the swaged portion 15, in order to allow a nice free working fit of the member 21 when assembled in the manner heretofore pointed out.

The members 21 have extensions 14 which are connected to the intermediate links designated by the numeral 26 which in turn have an end portion as designated by the numeral 27 (Figure 5) and have a further bent end designated by the numeral 28 which is bent in such a manner as to limit and gauge the rotation; hence the stopping portions 28 really co-operate with the stopping means heretofore described and illustrated in Figure 4, in order to positively lock in focal relationship the lens member when the members 21 are opened so as to be worn on the head of an observer or inspector.

The lens holder is primarily made approximately in the shape as shown, and is designated by the numeral 22 being provided with reduced upper portions in order to lend symmetry and design to the construction, and is provided with two curved end portions designated by the numeral 30 adapted to receive the lens designated 24 which is shaped aporoximately as indicated.

Any type lens may be utilized and hence the holders may be shaped accordingly in order to fit the respective lenses that are to be used which may be either permanently attached or interchangeably as will hereinafter be explained.

The lens is held in place by slipping it into the channel portions designated 30, and is held from dropping thru by the small ledges designated by the numeral 23.

The members 26 are permitted to swivel in the assembly at the point where they are attached to the lens holder member 22 by virtue of the backing plate designated by the numeral 32; the said backing plate being indented as indicated at 33 whereas the plate 22 is indented in semi-circular fashion as indicated at 31 thus providing suitable bearing surface and retaining means for the portions 27 of the intermediate linkage 26. The backing plate 32 is secured to the member 22 by pins or rivets designated 25.

An improved form or slight modification of the lens holder is shown in Figures 6 and 7 wherein the lens holder generally designated 22 has one side removed therefrom and in place thereof a separate piece designated by the numeral 34 is provided which has an arcuate or curved recess designated by the numeral 37, and a ledge portion designated by the numeral 35. This member 34 is swivelably attached at the point 36 and may be swung out as indicated by the dotted line when it is desired to exchange lenses, insert a lens, or remove a lens.

The device is first set for use by opening the same as indicated by dotted lines (Figure 2), this places the lens in position for observation and inspection. It can be seen according to Figure 2 that an observer wearing my invention may examine specimens requiring enlargement, and yet have free use of the hands.

The lines of vision are indicated when examining a specimen by the converging arrows passing thru the center of the binocular lens; whereas if the observer wishes to look up from his work, his vision will not be interfered with, for then he looks in the direction indicated by the parallel arrows demonstrating that his vision is not obstructed by any portion of my device. Thus it can be seen that my invention holds the lens in the most ideal position for observation and use.

Inasmuch as my device will be used by jewelers, optometrists, physicians, stamp collectors, examiners, and many others, it will be advantageous to use lenses of different focal ranges and magnification. When the device is not in use, it may be conveniently carried about, because it may be collapsed as shown in Figures 2 and 3.

Altho I have described the improvement in my invention, I feel that there is possibility of further modification and improvement, my presentation to be considered merely as a preferred form, and the right is reserved to all improvements and modifications coming within the scope of my invention, and the purview of the foregoing description; my invention being limited only by the appended claims.

Having thus revealed my invention what I claim as new and desire to secure by Letters Patent is:

1. In an instrument of the character described, in combination with a spectacle frame-work comprising, a bridge member, and temple bar members provided with forward extensions swivelably secured to the said bridge member, lens retaining means, intermediate link members pivotally secured at one of their ends to the forward extensions of the said temple bar members, their other ends having perpendicularly bent portions pivotally and adjacently secured to the said lens retaining means, and further provided with offset portions at the ends of the said perpendicularly bent portions cooperating with the said lens retaining means to function as stop means, and a single lens member interchangeably and removably mounted in the said lens retaining means, thus permitting both eyes of an observer to view an object simultaneously thru the focal center of the said lens member.

2. In an instrument of the character described, in combination with a spectacle frame-work, having a bridge member and a pair of temple bar members, provided with forward extensions, pivotally secured thereto, the said bridge member provided with extensions, stop means mounted on said extensions comprising, a pin member located inwardly of each of the said temple bar members adapted to limit the radial outward movement of the said temple bar members with respect to the said bridge member, lens retaining means, a pair of intermediate link members swivelably connected to the forward extensions of the said temple bar members at one of their ends, their other ends having perpendicularly bent portions pivotally and adjacently secured to the said lens retaining means, and further provided with offset portions at the ends of the said perpendicularly bent portions cooperating with the said lens retaining means to function as stop means, the temple bar member stop means and the intermediate link member stop means adapted to function simultaneously.

FRED HUSAR.